United States Patent [19]
Stagi

[11] 3,929,826
[45] Dec. 30, 1975

[54] INDAZOLE DERIVATIVES AS OPTICAL BRIGHTENERS

[75] Inventor: Mauro Stagi, Allschwil, Switzerland

[73] Assignee: Ciba-Geigy AG, Basel, Switzerland

[22] Filed: May 20, 1974

[21] Appl. No.: 471,514

Related U.S. Application Data

[62] Division of Ser. No. 241,385, April 5, 1972, Pat. No. 3,828,069.

[30] Foreign Application Priority Data

Apr. 19, 1971 Switzerland.......................... 5632/71

[52] U.S. Cl......... 260/310 D; 260/247.1; 260/293.6
[51] Int. Cl.².......................................... C07D 231/54
[58] Field of Search................................ 260/310 D

[56] References Cited
UNITED STATES PATENTS

| | | |
|---|---|---|
| 3,629,241 | 12/1971 | Krause et al..................... 260/310 D |
| 3,630,895 | 12/1971 | Krause et al..................... 260/310 D |
| 3,753,978 | 8/1973 | Adelsberger et al............ 260/310 D |
| 3,836,522 | 9/1974 | Somlo et al..................... 260/310 D |

OTHER PUBLICATIONS

Chem. Ber. 100, pp. 1580–1589 (1967).

Raciszewski et al., J. Amer. Chem. Soc., 91(16), pp. 4338–4341 (1969).

Primary Examiner—Donald B. Moyer
Attorney, Agent, or Firm—Joseph G. Kolodny; Edward McC. Roberts; Prabodh I. Almaula

[57] ABSTRACT

The present invention relates to new 1,3-diaryl-3a, 4, 5, 6, 7, 7a-hexahydroindazoles, which are useful as optical brighteners for high molecular organic materials.

4 Claims, No Drawings

INDAZOLE DERIVATIVES AS OPTICAL BRIGHTENERS

This is a division of application Ser. No. 241,385 filed on Apr. 5, 1972, now U.S. Pat. No. 3,828,069.

The present invention relates to new 1,3-diaryl-3a,4,5,6,7,7a-hexahydroindazole compounds, processes for their manufacture, their use for the optical brightening of synthetic and natural high molecular organic material, preferably in the form of fibres or fabrics, and their use as an additive in detergents and soaps.

It has now been found, surprisingly, that 1,3-diaryl-3a,4,5,6,7,7a-hexahydroindazoles in which the phenyl ring is substituted by specific groups in the 1-position, are valuable optical brighteners having a neutral white shade.

The optical brighteners according to the invention correspond to the formula (1) 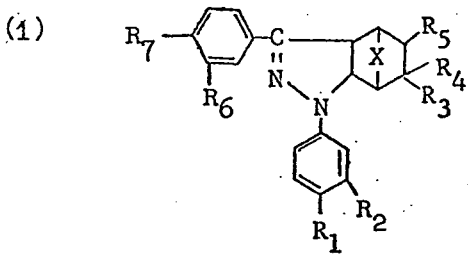

or positional isomers of $R_3$ and $R_4$ with $R_5$, wherein $R_1$ represents trifluoromethyl, nitrile, a —COOR,

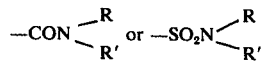

radical, wherein R and R' independently of one another represent hydrogen, or alkyl containing 1 – 4 carbon atoms and optionally substituted by hydroxyl, alkoxy, amino, sulphonic acid or carboxylic acid, or R and R' together with the nitrogen represent pyrrolidino or optionally methyl-substituted morpholino or piperidino, or the —SO$_2$—R'' radical, wherein R'' represents alkyl with 1 to 4 carbon atoms optionally substituted by hydroxyl, alkoxy, amino, sulphonic acid or carboxylic acid, or represents alkenyl with 2 to 4 C atoms or aryl, $R_2$ denotes hydrogen, chlorine or alkyl containing 1 to 3 carbon atoms, $R_3$, $R_4$ and $R_5$ independently of one another denote hydrogen, nitrile, alkyl possessing 1 to 4 carbon atoms, a —COOY or

radical, wherein Y and Y' independently of one another represent hydrogen or alkyl with 1 to 4 carbon atoms optionally substituted by hydroxyl, or Y and Y' together with the nitrogen represent pyrrolidino or optionally methyl-substituted piperidino or morpholino, or $R_4$ and $R_5$ together denote a fused benzene ring optionally containing non-chromophoric substituents, $R_6$ and $R_7$ independently of one another denote hydrogen, halogen up to atomic number 35 or alkyl possessing 1 to 4 carbon atoms and X represents —CH$_2$—, —O— or —NZ—, wherein Z represents alkyl with 1 to 4 carbon atoms.

Possible non-chromophoric substituents on the fused benzene ring are above all alkyl, such as methyl and ethyl, alkoxy, such as methoxy and ethoxy, and halogen, such as chlorine.

Within the framework of the formula (I), compounds of predominant interest are those of the formula

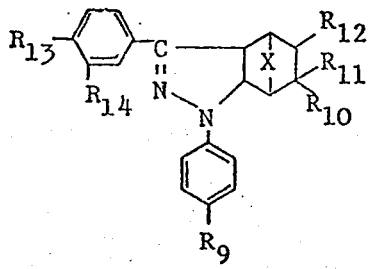

or positional isomers of $R_{10}$ and $R_{11}$ with $R_{12}$, wherein $R_9$ denotes nitrile, the

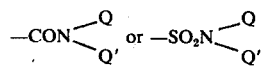

radicals, wherein Q and Q' independently of one another represent hydrogen or alkyl containing 1 to 4 carbon atoms which is optionally substituted by hydroxyl or alkoxy, or represents the —SO$_2$Q'' radical, wherein Q'' represents alkyl with 1 to 4 carbon atoms optionally substituted by hydroxyl, alkoxy, amino, sulphonic acid or carboxylic acid or represents alkenyl with 2 to 4 carbon atoms, $R_{10}$ denotes hydrogen or nitrile, $R_{11}$ and $R_{12}$ independently of one another denote hydrogen, nitrile, alkyl possessing 1 to 4 carbon atoms, or a —COOY or

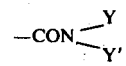

radical, wherein Y and Y' independently of one another represent hydrogen or optionally hydroxyl-substituted alkyl possessing 1 to 4 carbon atoms, or Y and Y' together with the nitrogen represent pyrrolidino or optionally methyl-substituted piperidino or morpholino, or $R_{11}$ and $R_{12}$ together denote a fused benzene ring, $R_{13}$ and $R_{14}$ independently of one another denote hydrogen, chlorine or alkyl with 1 to 3 carbon atoms and X denotes —CH$_2$—, —O— or —NZ—, wherein Z represents alkyl with 1 to 4 carbon atoms.

Preferred compounds correspond to the formula (3) 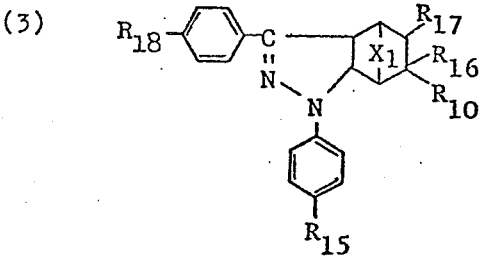

or positional isomers of $R_{10}$ and $R_{16}$ with $R_{17}$, wherein $R_{10}$ denotes hydrogen or nitrile, $R_{15}$ denotes nitrile, methylsulphonyl, carboxyl, or carbalkoxy with 2 to 5 carbon atoms, $R_{16}$ and $R_{17}$ independently of one another denote hydrogen, nitrile, alkyl with 1 to 4 carbon atoms, or carboxyl, optionally hydroxyl-substituted carbalkoxy with 2 to 5 carbon atoms or carbamoyl or $R_{16}$ and $R_{17}$ denote a fused benzene radical, $R_{18}$ denotes hydrogen, chlorine or methyl and $X_1$ denotes —$CH_2$—, —O— or

Compounds of outstanding practical interest are the indazoles of the formula (4) 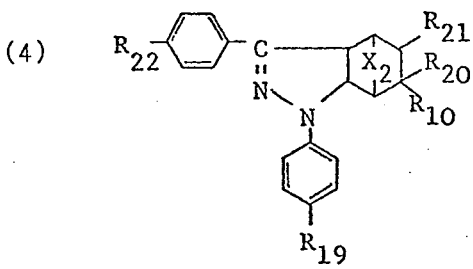

or positional isomers of $R_{10}$ and $R_{20}$ with $R_{21}$, wherein $R_{10}$ denotes hydrogen or nitrile, $R_{19}$ denotes nitrile or methylsulphonyl, $R_{20}$ denotes hydrogen, nitrile, carboxyl, optionally hydroxyl-substituted carbalkoxy with 2 to 5 carbon atoms or carbamoyl, $R_{21}$ denotes hydrogen or carbalkoxy with 2 to 5 carbon atoms or $R_{20}$ and $R_{21}$ together denote a fused benzene radical, $R_{22}$ denotes hydrogen or chlorine and $X_2$ denotes —$CH_2$—or —O—.

If a benzene radical is not fused to the bicycloheptane system, one each of the substituents $R_3$ and $R_4$, $R_{10}$ and $R_{11}$, $R_{10}$ and $R_{16}$ or $R_{10}$ and $R_{20}$ in the formulae (1), (2), (3) and (4) preferably represents a substituent other than nitrile, —COOY or

that is to say it represents alkyl or especially hydrogen.

The compounds according to the invention, of the formula (I), can be obtained in accordance with processes which are in themselves known, such as are described, for example, in Tetrahedron, 1962, Volume 17, Page 3 to 29. The process which in practice is most important for the manufacture of the compounds of the formula (I) is characterised in that an α-halogeno-aryl-aldehydehydrazone of the formula (5) 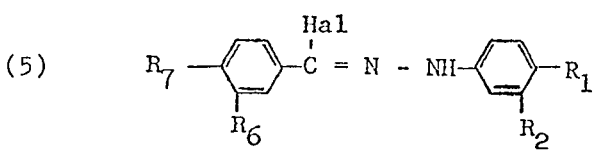

wherein $R_1$, $R_2$, $R_6$ and $R_7$ have the indicated meaning, is reacted with a bicycloheptene of the formula (6) 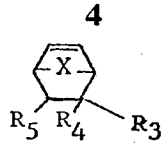

wherein X, $R_3$, $R_4$ and $R_5$ have the indicated meaning, in accordance with the principle of a 1-3-dipolar addition. The reaction is advantageously carried out in an organic solvent which is inert towards the reactants and in the presence of an acid acceptor, at temperatures of 0°—100°, preferably at 20 to 50°C.

Suitable solvents are above all optionally halogenated aromatic or aliphatic hydrocarbons, such as, for example, benzene, toluene, xylenes, chlorobenzene, dichlorobenzene, hexane, ligroin, methylene chloride, ethylene chloride, carbon tetrachloride and ethers, for example dioxane or diethyl ether.

Possible acid acceptors are NaOH, KOH and above all tertiary amines, such as triethylamine, diethylaniline or pyridine. In general, 1 to 10, preferably 1 to 5 equivalents of acid acceptor are employed per equivalent of hydrogen.

The α-halogeno-aryl-aldehyde-arylhydrazones of the formula (5) required as starting materials are manufactured in the usual manner.

Equally, the bicycloheptenes of the formula (6) are manufactured in accordance with known processes, in particular by a Diels-Alder addition of cyclopentadiene of furane or pyrrole to an activated ethylene bond in accordance with the following equation:

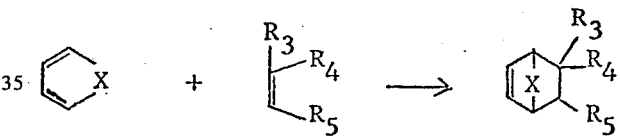

The new indazoles of the formula (1) are colourless, well-crystallised substances which are sparingly soluble to insoluble in hot water. They dissolve in organic solvents, for example in alkanols, lower fatty acids, lower fatty acid esters, lower fatty acid amides, lower ketones and in optionally halogenated aromatic hydrocarbons. The practically colourless organic solutions are distinguished by vivid violet to blue fluorescence.

The new indazoles are suitable for the optical brightening of high molecular organic material. Possible high molecular organic materials are above all synthetic organic polyplasts, that is to say plastics obtainable by polycondensation and polyaddition, for example polyolefines, such as polyethylene, polypropylene or polystyrene, and also polyvinyl chloride, polyacrylonitrile and its copolymers, polyurethanes, polyamides and cellulose esters.

The optical brightening of the high molecular organic material is effected, for example, by incorporating therein small amounts of optical brighteners according to the invention, for example 0.0001 to 2%, preferably 0.001 to 0.3%, relative to the material to be brightened, optionally together with other substances, such as plasticisers, pigments and the like. Depending on the nature of the material to be brightened, this is done by dissolving the brightener in the monomers before polymerisation, in the mass of the polymer or, together with the polymer, in a solvent. The material pretreated in this way is thereafter converted to the desired ultimate shape in accordance with processes which are in themselves known, such as calendering, pressing, extrusion, spreading, casting or injection moulding.

Preferably, however, high molecular organic material in the form of fibres is brightened, for example fibre material of polyamide, polyacrylonitrile and its copolymers, cellulose esters, such as cellulose acetates. Advantageously, an aqueous dispersion of indazoles according to the invention, of the formula (I), is used for the brightening of these fibre materials. The brightener dispersion here preferably contains 0.01 – 0.2% of indazole according to the invention, relative to the fibre material. In addition, it can contain auxiliaries, such as dispersing agents, for example condensation products of fatty alcohols possessing 10 to 18 carbon atoms with 15 to 25 mols of ethylene oxide, or condensation products of alkylmonoamines or polyamines possessing 16 to 18 carbon atoms with at least 10 mols of ethylene oxide and, where fibre material of polymeric or copolymeric acrylonitrile is brightened, also acids, especially organic acid, such as acetic, oxalic and preferably formic acid.

The brightening of the fibre material with the aqueous brightener dispersion is effected either by the exhaustion process at temperatures of, preferably, 60° to 100°C or by the padding process. In the latter case, the goods are impregnated with the brightener dispersion and are finished by, for example, steaming at 70° to 100°C, preferably with saturated neutral steam. The finished fibre material is finally rinsed and dried. Preferably the fibre material mentioned is brightened by the exhaustion process.

High molecular organic material optionally brightened in accordance with the invention, especially the synthetic fibre material brightened in accordance with the exhaustion process, shows an attractive pure white appearance with a bluish-tinged fluorescence.

Indazoles according to the invention can also be used for the optical brightening of detergents, for example soaps, soluble salts of fatty alcohol sulphates, higher alkyl-substituted and/or multiple-alkyl substituted aryl sulphonic acids, sulphonic-carboxylic acid esters of medium to higher alkanols, higher alkanoyl-aminoalkyl- or aminoaryl-carboxylic acids or -sulphonic acids or fatty acid glycerine-sulphates, as well as non-ionic detergents, such as higher alkylphenolpolyclycolethers.

Detergents according to the invention can contain the customary fillers and auxiliaries, for example alkali polyphosphates, and polymetaphosphates, alkali silicates, alkali borates, alkali salts of carboxymethylcelluloses, foam stabilisers, such as alkanolamides of higher fatty acids, or complexones, such as soluble salts of ethylenediaminetetraacetic acid.

The new indazoles are appropriately incorporated into the detergents or into washing liquors in the form of their solutions in neutral organic solvents which are miscible with water and/or are easily volatile, such as lower alkanols, lower alkoxyalkanols, lower fatty acid amides or lower aliphatic ketones. They can, however, also be used in a finely divided solid form, by themselves or mixed with dispersing agents. For example, they can be mixed, kneaded or ground with the detergent substances and the customary auxiliaries and fillers can then be mixed in. For example, the brighteners are stirred with the detergent substances, customary auxiliaries and fillers and water to give a paste, and this paste is then sprayed in a spray drier. The new indazole derivatives can also be mixed with finished detergents, for example by spraying a solution in an easily volatile and/or water-soluble organic solvent onto the dry agitated detergents. The content of optical brightener of the formula (1) in the detergents is advantageously 0.001 – 0.5% relative to the solids content of the detergent.

Wash liquors which contain indazoles according to the invention, of the formula (1), on washing impart a brilliant appearance in daylight to the textile fibres treated therewith, for example synthetic polyamide and cellulose ester fibres. They can therefore be used particularly for washing these synthetic fibres or the textiles or textile components consisting of such fibres, and for laundry. For use in household laundry, they can additionally contain yet further optical brighteners possessing an affinity for other fibres, for example for cellulose.

In order to achieve a particular white shade it often proves advisable to employ mixtures of hexahydroindazoles according to the invention. such mixtures can be purely mechanical mixtures of the individual components or can be actual crystal compounds of which the crystal structure is different from those of the individual components. Such a mixture can be manufactured by dry mixing, fusing together or conjoint recrystallisation of the individual components.

By positional isomers of $R_3$ and $R_4$ with $R_5$, compare formula (1), there are to be understood compounds of the formula (1a)

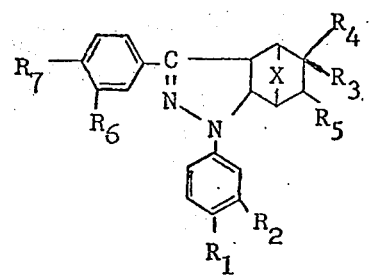

wherein $R_1$ to $R_7$ and X have the indicated meaning. A remark in the same general sense applies also to the compounds of the formulae (2) to (4) as well as (10); and accordingly to the examples of the formulae (12) to (34) and (43) to (59).

EXAMPLE 1

90 parts of α-chloro-[(4-chloro)-benzaldehyde-(4'-cyanophenyl)]-hydrazone and 79 parts of norbornene are suspended in 1,500 parts of toluene. 150 parts of triethylamine are added dropwise at 50–60°C and the mixture is stirred for a further 3 hours at this temperature. Thereafter the suspension is cooled, the triethylamine hydrochloride is filtered off and the filtrate is evaporated. The residue is then crystallised from isopropanol. In this way, 77 parts of the compound of the formula (7)

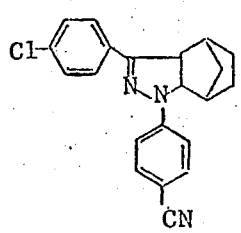

of melting point 194°–195°C are obtained.

The new compound fluoresces with an intense blueviolet colour in organic solvents. It is above all suitable for the optical brightening of polyamide, polyacrylonitrile, cellulose acetate and wool.

EXAMPLE 2

If instead of α-chloro-[(4-chloro)-benzaldehyde-(4'-cyanophenyl)]-hydrazone equimolar amounts of substituted α-chlorohydrazones of the formula (8) 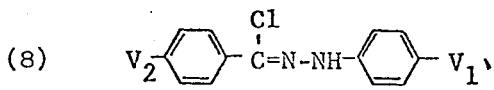

are used and instead of norbornene the substituted norbornenes of the formula (9) 

are used and in other respects the procedure of Example 1 is followed, the substituted hexahydroindazoles of the formula

(10) 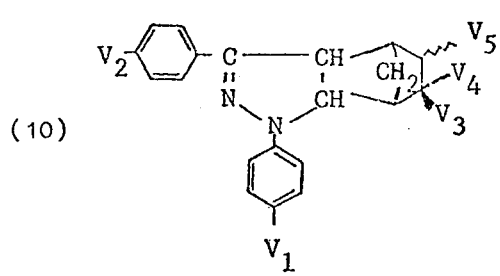

or positional isomers of $V_3$ and $V_4$ with $V_5$, of Table I, are obtained.

EXAMPLE 3

If, in Example 1, instead of norbornene equimolar amounts of 3,6-oxa-4-carbomethoxy-cyclohexane are employed, the compound of the formula

(34) 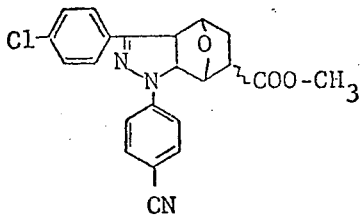

of melting point 172°–174°C is obtained.

The new compound fluoresces with a very intense blue-violet colour in organic solvents and is suitable for the optical brightening of polyamide, cellulose acetate and wool.

EXAMPLE 4

If in Example 1, instead of norbornene, equimolar amounts of 1,4-dihydro-1,4-epoxynaphthalene are employed, the compound of the formula

(35) 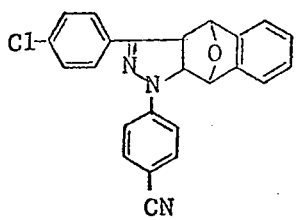

of melting point 200°–201°C is obtained in high yield.

The new compound is above all suitable for the brightening of polyamide and cellulose acetate.

EXAMPLE 5

If instead of α-chloro-[(4-chloro)-benzaldehyde-(4'-cyanophenyl)]-hydrazone, equimolar amounts of α-chloro-[(4-chloro)-benzaldehyde-(4'-methylsulpho-

TABLE I

| Compound of the Formula | $V_1$ | $V_2$ | $V_3$ | $V_4$ | $V_5$ | Melting Point °C | % exo endo |
|---|---|---|---|---|---|---|---|
| (11) | SO₂CH₃ | H | H | H | H | 237–238 | |
| (12) | SO₂CH₃ | Cl | CN | H | H | > 250 | about 65 |
| (13) | SO₂CH₃ | Cl | H | CN | H | 238–240 | about 90 |
| (14) | SO₂CH₃ | Cl | CN | CH₃ | H | > 250 | |
| (15) | SO₂CH₃ | H | H | COOH | H | > 250 | |
| (16) | SO₂CH₃ | Cl | H | COOH | H | > 250 | |
| (17) | SO₂CH₃ | Cl | H | COOCH₃ | H | 176–178 | |
| (18) | SO₂CH₃ | H | H | COOCH₃ | H | 143–147 | |
| (19) | SO₂CH₃ | Cl | H | CONH₂ | H | 168–171 | |
| (20) | SO₂CH₃ | H | H | COOCH₂CH₂OH | H | 105–107 | |
| (21) | SO₂CH₃ | Cl | H | COOH | COOCH₃ | 159–62 | |
| (22) | SO₂CH₃ | Cl | H | COOC₄H₉ | COOC₄H₉ | 125–130 | |
| (23) | SO₂CH₃ | Cl | H | COOCH₃ | COOCH₃ | 235–236 | |
| (24) | CN | H | H | H | H | 174–176 | |
| (25) | CN | Cl | CN | H | H | 238–241 | about 65 |
| (26) | CN | Cl | H | CN | H | > 250 | about 90 |
| (27) | CN | Cl | CN | CH₃ | H | > 250 | |
| (28) | CN | Cl | H | COOH | H | > 250 | |
| (29) | CN | Cl | H | CONH₂ | H | > 260 | |
| (30) | CN | Cl | H | COOCH₃ | H | 173–174 | |
| (31) | CN | Cl | H | COOH | COOCH₃ | | |
| (32) | CN | Cl | H | COOC₄H₉ | COOC₄H₉ | 103–104 | |
| (33) | CN | Cl | H | COOCH₃ | COOCH₃ | 217–218 | | phenyl)]-hydrazone are employed and instead of norbornene equimolar amounts of 1,4-dihydro-1,4-methano-naphthalene are employed and in other respects the procedure of Example 1 is followed, the compound of the formula

(36) 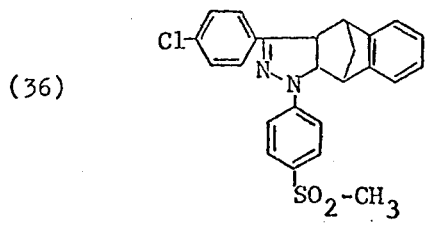

of melting point 260°C is obtained in high yield.

EXAMPLE 6

If in Example 4 α-chloro-benzaldehyde-phenylhydrazone and 1,4-dihydro-1,4-methanonaphthalene are employed as the reaction components, the compound of the formula

(37) 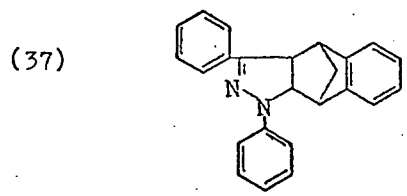

of melting point 180°C is obtained.

EXAMPLE 7

If the same procedure as in Example 1 is followed but 15.4 parts of α-chlorobenzaldehyde-(4-methylsulphophenyl)-hydrazone and 19.9 parts of 1,4-dihydro-1,4-methano-naphthalene are employed, the compound of the formula

(38) 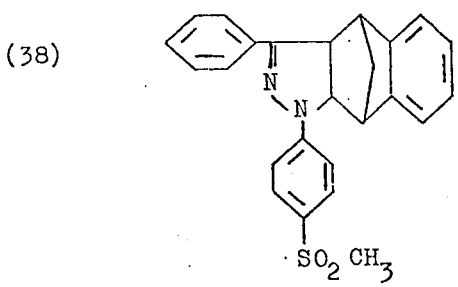

is obtained in good yield. The analytically pure compound obtained by recrystallisation from toluene melts at above 260°C and shows excellent brightener effects in plastic compositions.

EXAMPLE 8

7 parts of α-chloro/(4-chloro)-benzaldehyde-(4'-methylsulphophenyl)/-hydrazone and 7.2 parts of the compound

(39) 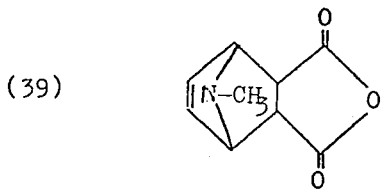

are suspended in 50 parts of toluene and 9 parts of triethylamine are added over the course of 30 minutes at 50°C. The mixture is thereafter stirred for a further 3 hours, the solvent is distilled off in vacuo and the residue is washed with cold water, thoroughly suction-filtered off and dried in vacuo. The dried product is thereafter boiled for 10 hours under reflux with 50 parts of methanol and 0.5 part of p-toluenesulphonic acid. The compound of the formula

(40) 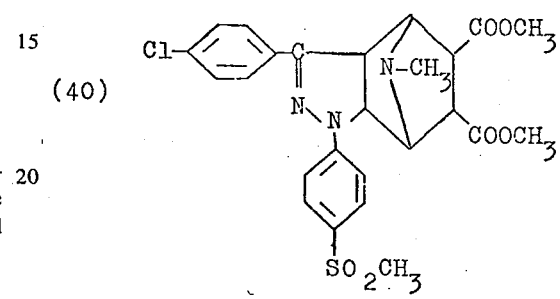

is thus obtained. It shows an absorption maximum in dioxane at 370 nm and fluoresces with an intense blue-violet colour in organic solvents.

The intermediate product

(41) 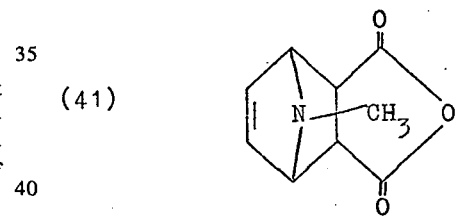

is obtained by the reaction of maleic anhydride with a four-fold amount of N-methylpyrrole at room temperature. The light yellow crystalline compound sublimes without melting.

EXAMPLE 9

The compounds of the formula

(42) 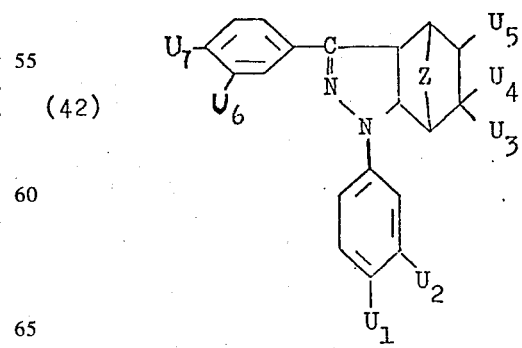

listed in the table which follows are obtained in analogous ways to those described in Examples 1 – 8.

Table

| Compound of the Formula | U₁ | U₂ | U₃ | U₄ | U₅ | U₆ | U₇ | Z |
|---|---|---|---|---|---|---|---|---|
| 43 | —CN | —H | —CN | —H | —H | —Cl | —CH₃ | —CH₂— |
| 44 | —COOH | —Cl | —COOCH₃ | —H | —COOCH₃ | —H | —Cl | —CH₂— |
| 45 | —COOCH₃ | —H | —CN | —CN | —CN | —H | —H | —CH₂— |
| 46 | —COOCH₂CHOH | —H | —CN | —CN | —CH₃ | —H | —Cl | —CH₂— |
| 47 | —CON(CH₃)₂ | —H | —CON | —H | —COOCH₃ | —H | —CH₃ | —CH₂— |
| 48 | —SO₃CH₃ | —CH₃ | —COOCH₃ | —H | —COOCH₃ | —Cl | —CH₃ | —O— |
| 49 | —SO₂NH₂ | —H | —COOCH₃ | —H | —COOCH₃ | —H | —Cl | N—CH₃ |
| 50 | —SO₂N(CH₃)₂ | —H | — |  | | —H | —CH₃ | —O— |
| 51 | —CF₃ | —H | —H | —H | —H | —Cl | —H | —CH₂— |
| 52 | —COOC₂H₄OCH₃ | —Cl | —CN | —CH₃ | —H | —H | —H | —CH₂— |
| 53 | —COOC₂H₄N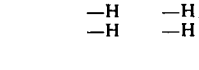 | —H | —H | —H | —H | —H | —H | —CH₂— |
| 54 | —SO₂CH=CH₂ | —H | —COOC₄H₉ | —H | —COOC₄H₉ | —H | —Cl | —O— |
| 55 | —SO₂CH₂CH₂OH | —H | —COOCH₂CH₂N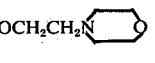 | —H | —COOCH₂CH₂N | —Cl | —H | —CH₂— |
| 56 | —SO₂CH₂CH₂OSO₃H | —H | —H | —H | —H | —H | —Cl | —CH₂— |
| 57 | —SO₂C₂H₄OCHCH₂N(CH₃)₂ | —H | —H | —H | —H | —H | —Cl | —CH₂— |
| 58 | —SO₂N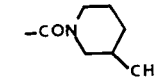 | —H | —CON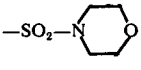 | —H | —COOCH₃ | —Cl | —CH₃ | —CH₂— |
| 59 | —SO₂—N | —H | -CON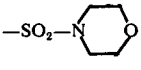 | —H | —COOCH₃ | —Cl | —CH₃ | —CH₂— |

EXAMPLE 10

Brightening of Nylon in a Washing Bath 0.4 g of detergent of the following composition are added to 100 ml of water:

| | | |
|---|---|---|
| Dodecylbenzenesulphonate | | 16% |
| Fatty alcohol-sulphonate | | 4% |
| Na tripolyphosphate | | 35% |
| Tetra-Na pyrophosphate | | 7% |
| Mg silicate (MgSiO₃) | | 2% |
| Na disilicate (Na₂(SiO₃)₂) | | 7% |
| Carboxymethylcellulose | | 1% |
| Sequestrene ST | | 0.5% |
| Glauber's salt | approx. | 25% |
| Water | | 2.5% |

*(Instead of Glauber's salt, the detergent can also contain 10 – 20% of Na perborate or of some other oxygendonating agent).

A solution of the optical brightener of the formula (7) is prepared by dissolving 1 g in 1,000 ml of dimethylformamide. 2 ml of this stock solution are added to the solution described above. This aqueous solution (or dispersion) containing the brightener is warmed to 60°C. A nylon fabric weighing 3 g is then introduced into the solution and is treated at this temperature for 30 minutes. The fabric is then rinsed for 2 minutes in running cold water and is subsequently dried for 20 minutes at 60°C.

The fabric treated in this way shows a distinct brightening effect.

Identical effects are obtained if instead of the compound of the formula (7) a compound of the formula (18), (20), (22), (24), (25), (30) or (33) is employed.

EXAMPLE 11

Brightening of Polyamide by the Exhaustion Process under Acid Conditions 0.12 ml of 85% strength formic acid and 0.06 g of Tinegal NA (= alkyl-polyglycol-ether) are added to 100 ml of water.

A solution of the optical brightener of the formula (24) is prepared by dissolving 1 g in 1,000 ml of dimethylformamide. 3 ml of this stock solution are added to the solution described above. This aqueous solution or dispersion containing the brightener is warmed to 60°C and a polyamide fabric weighing 3 g is then introduced into the solution. The temperature is raised to 92° – 95°C over the course of 10 – 15 minutes and is maintained thereat for 30 minutes. The fabric is then rinsed for 2 minutes in running cold water and is subsequently dried for 20 minutes at 60°C.

The fabric treated in this way shows a distinct brightening effect.

Equally good results are obtained if instead of the compound of the formula (24) a compound of the formula (12), (13), (17), (18), (20), (22), (23), (25), (26), (27), (30) or (32) is employed.

EXAMPLE 12

Brightening of Polyamide by the Exhaustion Process under Neutral Conditions 0.06 g of Tinegal NA (= alkyl-polyglycol-ether) is added to 100 ml of water.

A solution of the optical brightener of the formula (13) is prepared by dissolving 1 g in 1,000 ml of dimethylformamide. 3 ml of this stock solution are added to the solution described above. This aqueous solution or dispersion containing the brightener is warmed to 60°C and a nylon fabric weighing 3 g is then introduced into the solution. The temperature is raised to 92°–95°C over the course of 10 –·15 minutes and is kept thereat for 30 minutes. The fabric is then rinsed for 2 minutes in running cold water and is subsequently dried for 20 minutes at 60°C.

The fabric treated in this way shows a distinct brightening effect.

If the compound of the formula (13) is replaced by a compound of the formula (7), (14), (17), (18), (20), (22), (23), (24), (25), (26), (27), (30) or (33), similar results are obtained.

EXAMPLE 13

Brightening of Orlon by the Exhaustion Process under Acid Conditions 0.12 ml of 85% strength formic acid and 0.06 g of Tinegal NA (= alkyl-polyglycolether) are added to 100 ml of water. alkyl-polyglycol-ether)

A solution of the optical brightener of the formula (17) is prepared by dissolving 1 g in 1,000 ml of dimethylformamide. 1.5 ml of this stock solution are added to the solution described above. This aqueous solution (or dispersion) containing the brightener is warmed to 60°C and an Orlon fabric weighing 3 g is then introduced into the solution. The temperature is raised to 95°– 98°C over the course of 10 – 15 minutes and is kept thereat for 60 minutes. The fabric is then rinsed for 2 minutes in running cold water and is subsequently dried for 20 minutes at 50°C.

The fabric treated in this way shows a distinct brightening effect.

Identical effects are obtained if the compound of the formula (17) is replaced by a compound of the formula (7), (13) or (24).

EXAMPLE 14

Brightening of 2½-Acetate by the Exhaustion Process under Acid Conditions 0.06 ml of 40% strength acetic acid and 0.06 ml of Tinegal NA (= alkyl-polygylcol-ether) are added to 95 ml of water.

A solution of the optical brightener of the formula (17) is prepared by dissolving 1 g in 1,000 ml of dimethylformamide. 6 ml of this stock solution are added to the solution described above. This aqueous solution or dispersion containing the brightener is warmed to 40°C and an acetate fabric weighing 3 g is then introduced into the solution. The temperature is raised to 75° – 80°C over the course of 10 – 15 minutes and is kept thereat for 30 minutes. The fabric is then rinsed for 2 minutes in running cold water and is subsequently dried for 20 minutes at 60°C.

The fabric treated in this way shows a distinct brightening effect.

Identical effects are obtained with the compounds of the formulae (7), (13), (14), (17), (24), (27), (30) or (33).

EXAMPLE 15

Brightening of Triacetate by the Exhaustion Process under Acid Conditions 0.06 ml of 40% strength acetic acid and 0.06 ml of Tinegal NA (= alkyl-polyglycol-ether) are added to 95 ml of water.

A solution of the optical brightener of the formula (13) is prepared by dissolving 1 g in 1,000 ml of dimethylformamide. 6 ml of this stock solution are added to the solution described above. This aqueous solution or dispersion containing the brightener is warmed to 60°C and a triacetate fabric weighing 3 g is then introduced into the solution. The temperature is raised to 95° – 98°C over the course of 10 – 15 minutes and is kept thereat for 30 minutes. The fabric is then rinsed for 2 minutes in running cold water and is subsequently dried for 20 minutes at 60°C.

The fabric treated in this way shows a distinct brightening effect.

Similar results are obtained if instead of the compound of the formula (13) a compound of the formula (7), (17), (24), (25), (30) or (32) is used.

EXAMPLE 16

Brightening of Wool in a Reducing Bleach Bath under Neutral Conditions 0.36 g of Clarit PS and — in the case of water-insoluble brighteners — additionally 0.06 g of Tinegal NA (= alkyl-polyglycol-ether) are added to 110 ml of water.

A solution of the optical brightener of the formula (30) is prepared by dissolving 1 g in 1,000 ml of dimethylformamide. 7.5 ml of this stock solution are added to the solution described above. This aqueous solution (or dispersion) containing the brightener is warmed to 40°C and a pre-bleached woolen fabric or yarn weighing 3 g is then introduced into the solution. The temperature is raised to 60°C over the course of 10 – 15 minutes and is kept thereat for 60 minutes. The fabric is then rinsed for 2 minutes in running cold water and is subsequently dried for 20 minutes at 60°C.

The fabric treated in this way shows a distinct brightening effect.

Similar results are obtained with compounds of the formula (7), (13), (18), (24), (25), (32) or (33).

EXAMPLE 17

10,000 parts of a polyamide in chip form, manufactured from ε-caprolactam in a known manner, are mixed with 30 parts of titanium dioxide (rutile modification) and 2 parts of the compound of the formula (17), (18), (20), (23), (30), (32) or (33) in a tumbler vessel for 12 hours. After displacing the atmospheric oxygen, the chips treated in this way are fused in a kettle heated to 270°C and the melt is stirred for half an hour. It is then extruded under a nitrogen pressure of 5 atmospheres gauge through a spinneret and the cooled filament is wound up on a spinning bobbin. The filaments produced show an excellent brightening effect which is resistant to thermofixing and has good fastness to washing and to light.

EXAMPLE 18

An intimate mixture of 100 parts of polyvinyl chloride, 3 parts of stabiliser (Advastat BD 100; Ba/Cd complex), 2 parts of titanium dioxide, 59 parts of dioctyl phthalate and 0.01 to 0.2 part of one of the compounds of the formulae (17), (23), (30), (36) or (38) is milled on a calender at 150° to 155°C to give a sheet. The opaque polyvinyl chloride sheet thus obtained has a substantially higher degree of whiteness than a sheet which does not contain the optical brightener.

EXAMPLE 19

100 parts of polystyrene and 0.1 part of one of the compounds of the formulae (30), (32), (33) or (37) are fused for 20 minutes at 210°C in a tube of 1 cm diameter, with exclusion of air. After cooling, an optically brightened polystyrene composition of good fastness to light is obtained.

EXAMPLE 20

1.5 g of a delustring agent, 1 g of titanium dioxide (rutile type) and 0.05 g of a compound of the formulae (17), (18), (20), (23), (30), (32), (33), (35), (36), (37) or (38) are stirred into a polyurethane coating composition of 13.3 g of isocyanate-modified polyester, 26.7 g of ethyl acetate, 2 g of reaction accelerator and 2 g of polyfunctional isocyanate as a crosslinking agent. This mixture is left to stand for 2 hours and is then spread by means of a knife or a film-drawing rod on a cotton fabric (wet film thickness 1 mm). Thereafter the fabric is dried for 24 hours at room temperature. The fabric coated in this way shows a strong optical brightening effect of good fastness to light.

EXAMPLE 21

A 13% strength casting composition of acetylcellulose in acetone which contains — relative to the dry weight of plastic — 2% of anatase (titanium dioxide) as the delustring agent, and 0.04% of the compounds of the formula (38), is cast on a glass plate and spread by means of a metal rod to give a thin film. After drying, the film shows a substantially higher degree of whiteness than a film manufactured in the same way which does not contain an optical brightener.

EXAMPLE 22

7 g of anatase (TiO$_2$), followed by 350 g of acrylonitrile polymer in powder form, are introduced into 1,400 ml of dimethylformamide. The mixture is converted into a viscous mass using a high speed stirrer. 5 mg of a compound of the formulae (17), (18), (20), (23), (30), (32), (33), (36), (37) or (38) are dissolved in 50 g of this 20% strength-polyacrylonitrile solution and after removal of the air bubbles the mass is cast on a glass plate and spread by means of a metal rod with 1 mm thick guide sleeves to give a uniform film. After drying in a stream of air, the film can be pulled off the glass plate. It has a substantially higher degree of whiteness than a film manufactured in the same way which does not contain the optical brightener.

I claim:

1. A 1,3-Diaryl-3a,4,5,6,7,7a-hexahydroindazole corresponding to the formula

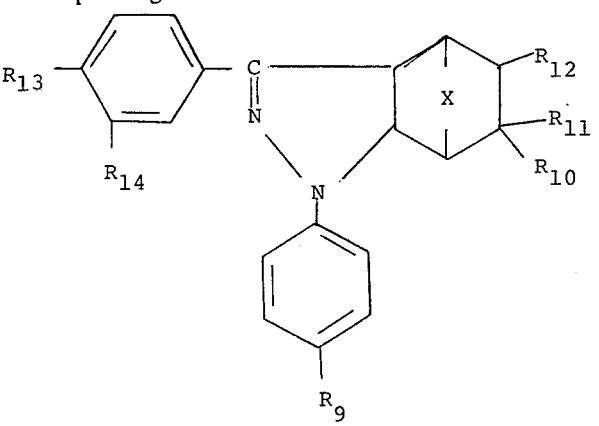

or positional isomers of $R_{10}$ and $R_{11}$ with $R_{12}$, wherein $R_9$ denotes the

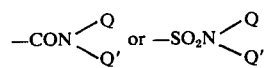

radicals, wherein Q and Q' independently of one another represent hydrogen, alkyl with 1 to 4 carbon atoms or alkyl with 1 to 4 carbon atoms substituted by hydroxyl or alkoxy, or represents the —SO$_2$Q'' radical, wherein Q'' represents alkyl with 1 to 4 carbon atoms or alkyl with 1 to 4 carbon atoms substituted by hydroxyl, amino, sulphonic acid or carboxylic acid or represents alkenyl with 2 to 4 carbon atoms, $R_{10}$ denotes hydrogen or nitrile, $R_{11}$ and $R_{12}$ independently one of another denote hydrogen, nitrile, alkyl possessing 1 to 4 carbon atoms, or a —COOY or

radical, wherein Y and Y' independently of one another represent hydrogen, alkyl of 1 to 4 carbon atoms, hydroxy-substituted alkyl of 1 to 4 carbon atoms, or $R_{11}$ and $R_{12}$ together denote a fused benzene ring, $R_{13}$ and $R_{14}$ independently of one another denote hydrogen, chlorine or alkyl of 1 to 3 carbon atoms and X denotes —CH$_2$—.

2. A 1,3-Diaryl-3a,4,5,6,7,7a-hexahydroindazole according to claim 1, corresponding to the formula

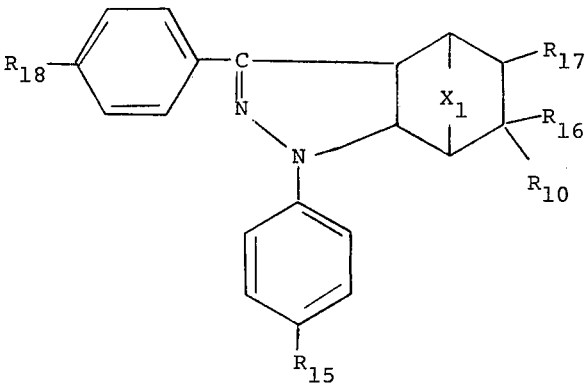

wherein $R_{10}$ denotes hydrogen or nitrile, $R_{15}$ denotes methylsulphonyl, $R_{16}$ and $R_{17}$ independently of one another denote hydrogen, nitrile, alkyl with 1 to 4 carbon atoms, or carboxyl, carbalkoxy with 2 to 5 carbon atoms, hydroxyl-substituted carbalkoxy with 2 to 5 carbon atoms or carbamoyl or $R_{16}$ and $R_{17}$ denote a fused benzene radical, $R_{18}$ denotes hydrogen, chlorine or methyl and $X_1$ denotes

—CH$_2$—.

3. A 1,3-Diaryl-3a,4,5,6,7,7a-hexahydroindazole according to claim 1, corresponding to the formula

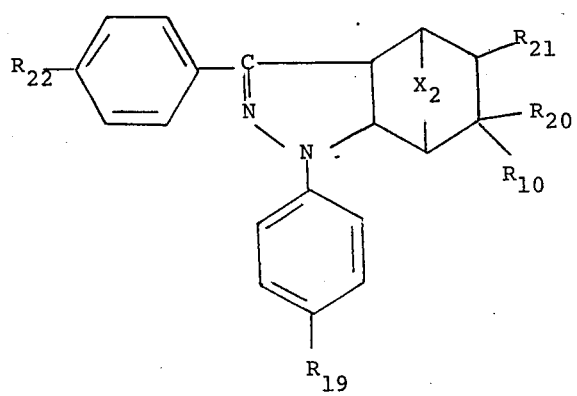

wherein $R_{10}$ denotes hydrogen or nitrile, $R_{19}$ denotes methylsulphonyl, $R_{20}$ denotes hydrogen, nitrile, carboxyl, carbalkoxy with 2 to 5 carbon atoms, hydroxyl-substituted carbalkoxy with 2 to 5 carbon atoms or carbamoyl, $R_{21}$ denotes hydrogen or carbalkoxy with 2 to 5 carbon atoms or $R_{20}$ and $R_{21}$ together denote a fused benzene radical, $R_{22}$ denotes hydrogen or chlorine and $X_2$ denotes —$CH_2$—.

4. A compound according to claim 3 in which $R_{10}$ denotes hydrogen, $R_{19}$ denotes methylsulfonyl, $R_{20}$ denotes —$COOCH_3$, $R_{21}$ denotes hydrogen and $X_2$ denotes —$CH_2$—.

* * * * *